United States Patent
Kozloski et al.

(10) Patent No.: US 9,762,655 B2
(45) Date of Patent: Sep. 12, 2017

(54) DIRECTING COMMUNICATIONS TO NODES OF A SOCIAL NETWORK USING AN ELASTIC MAP

(71) Applicant: International Business Machines Corporation, Armonk, NY (US)

(72) Inventors: James R. Kozloski, New Fairfield, CT (US); Timothy M. Lynar, Melbourne (AU); Clifford A. Pickover, Yorktown Heights, NY (US); John M. Wagner, Carlton (AU)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 14/133,942

(22) Filed: Dec. 19, 2013

(65) Prior Publication Data
US 2015/0180940 A1 Jun. 25, 2015

(51) Int. Cl.
*H04L 29/08* (2006.01)
*G06Q 50/00* (2012.01)
*H04L 29/06* (2006.01)

(52) U.S. Cl.
CPC ............ *H04L 67/10* (2013.01); *G06Q 50/01* (2013.01); *H04L 67/42* (2013.01); *H04L 67/22* (2013.01)

(58) Field of Classification Search
CPC ..................................................... G06Q 50/01
USPC ........................................................ 709/204
See application file for complete search history.

(56) References Cited

U.S. PATENT DOCUMENTS

| | | | |
|---|---|---|---|
| 7,231,651 B2 | 6/2007 | Pong | |
| 7,366,759 B2 | 4/2008 | Trevithick et al. | |
| 7,827,574 B1 | 11/2010 | Hendricks et al. | |
| 8,099,433 B2 | 1/2012 | Sittig et al. | |
| 2009/0254549 A1* | 10/2009 | Epstein | 707/5 |
| 2009/0287678 A1 | 11/2009 | Brown et al. | |
| 2012/0158487 A1 | 6/2012 | Ogawa | |
| 2014/0075002 A1* | 3/2014 | Pradhan et al. | 709/223 |
| 2014/0082024 A1* | 3/2014 | Cao | G06F 17/30601 707/802 |

FOREIGN PATENT DOCUMENTS

| | | |
|---|---|---|
| CN | 104735045 A | 6/2015 |
| WO | 0068860 | 11/2000 |
| WO | 2005089286 A2 | 9/2005 |

OTHER PUBLICATIONS

Mell et al., "The NIST Definition of Cloud Computing", Version 15, Oct. 7, 2009, National Institute of Standards and Technology, Information Technology Laboratory.
Wikipedia, "Elastic Map," https://en.wikipedia.org/wiki/Elastic_map, Printed on Mar. 24, 2016, pp. 1-4.

* cited by examiner

*Primary Examiner* — Vivek Srivastava
*Assistant Examiner* — Sibte Bukhari
(74) *Attorney, Agent, or Firm* — Reza Sarbakhsh

(57) ABSTRACT

A target space having configurable parameters may be defined such that nodes of a corresponding social network may be adapted to an elastic map of the target space. Communications may be directed to one or more nodes of the social network based on the computed elastic map.

19 Claims, 5 Drawing Sheets

DIRECTING COMMUNICATIONS TO NODES OF A SOCIAL NETWORK USING AN ELASTIC MAP

FIELD

The present invention relates generally to computer modeling, and more particularly to modeling aspects of a social network.

BACKGROUND

Social networks hosted or accessed on computer systems or electronic networks may include a set of nodes having characteristics and relationships. Depending on the context of the social network, there may be an interest in directing targeted communications to a subset of the social network depending on identifiable characteristics of the subset that make the directed communications particularly relevant to that subset of nodes. Therefore, it may be desirable to implement a method, system and/or computer program product to take advantage of information available regarding the social network and characteristics of the directed communications to make the communications more effective.

BRIEF SUMMARY

According to an embodiment of the present invention, a computer-implemented method for directing communications to a set of nodes in a social network on a plurality of computerized hosts defines a target space of data on a computer, the target space having a plurality of points and a set of configurable parameters, using a computer. The method computes an elastic map of the target space based on a plurality of relationship measures of a plurality of nodes in a social network on a plurality of computerized hosts, using a computer. The method directs a plurality of communications to a set of nodes of the plurality of nodes in the social network based on a geometry of the computed elastic map of the target space.

According to a further aspect of the disclosure, a system for directing communications to a set of nodes in a social network on a plurality of computerized hosts includes a computer having a processor and a computer-readable storage device, and a program embodied on the storage device for execution by the processor. The program has a set of modules that includes a defining module configured to define a target space having a set of points and a set of configurable parameters. A computing module is configured to compute an elastic map of the target space based on relationship measures of the nodes in the social network. A directing module is configured to direct communications to a set of the nodes in the social network based on a geometry of the computed elastic map of the target space.

According to a further aspect of the invention, a computer program product for directing communications to a set of nodes in a social network on a plurality of computerized hosts includes a computer-readable storage medium having program code embodied therewith, the program code being readable/executable by a processor of a computer to perform a method. The method defines a target space having a set of points and a set of configurable parameters, and computes an elastic map of the target space based on relationship measures of nodes in a social network. The method directs communications to a set of the nodes in the social network based on a geometry of the computed elastic map of the target space.

Further features as well as the structure and operation of various embodiments are described in detail below with reference to the accompanying drawings. In the drawings, like reference numbers indicate identical or functionally similar elements.

DETAILED DESCRIPTION

Figure 1:
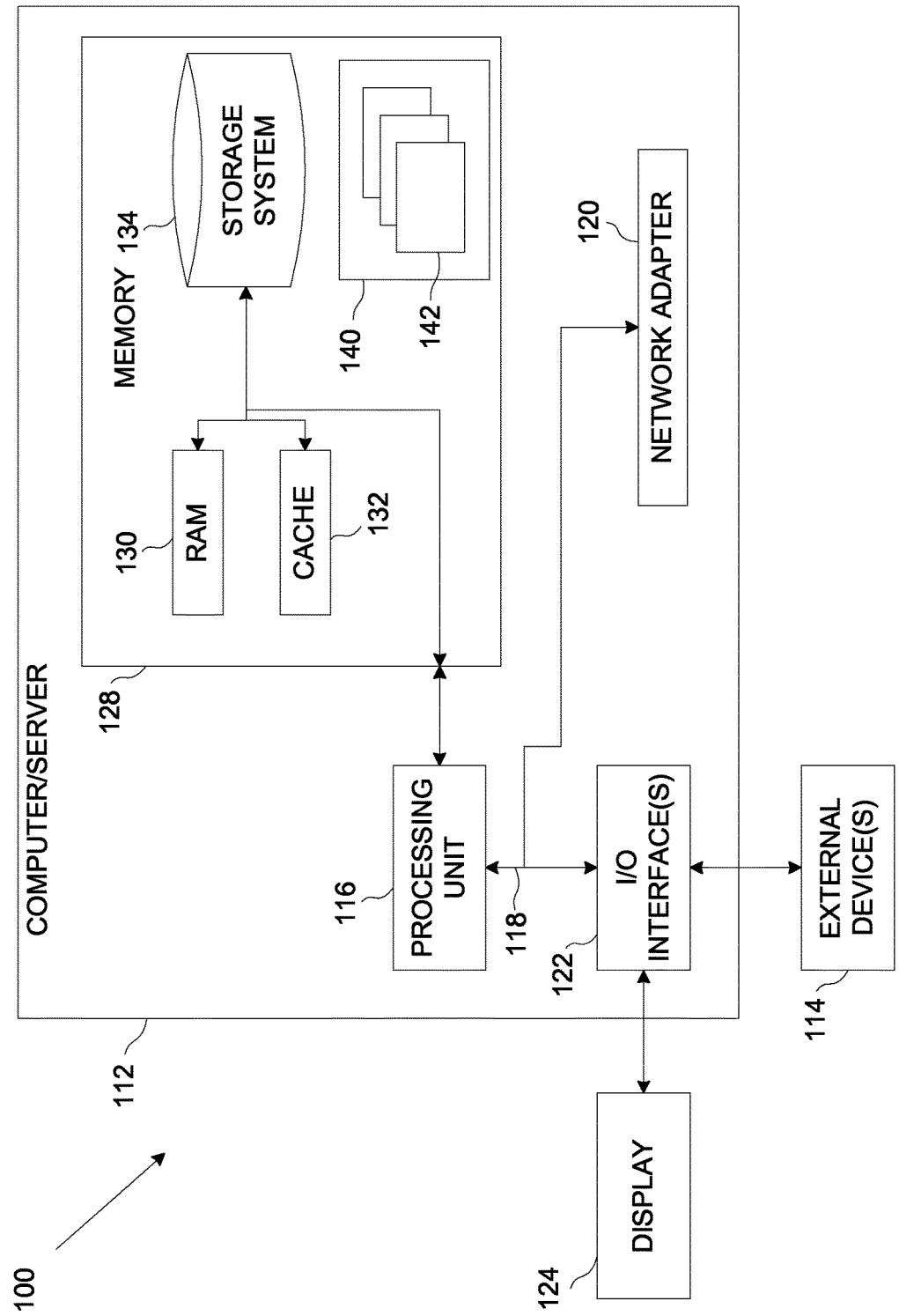
FIG. 1 is a block diagram of a computer system, according to an aspect of the present invention.

Referring to FIG. 1A, a schematic of an exemplary computing system is shown. The computer system 10 is one example of a suitable computer system and is not intended to suggest any limitation as to the scope of use or functionality of embodiments of the invention described herein.

In the computer system 10, shown in FIG. 1A, a computer/server 12 is operational with numerous other general purpose or special purpose computing system environments or configurations. Examples of well-known computing systems, environments, and/or configurations that may be suitable for use with the computer/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer/server 12 may be described in the general context of computer system-executable instructions, such as program modules, being executed by the computer system 10. Generally, program modules may include routines, programs, objects, components, logic, data structures, and so on that perform particular tasks or implement particular abstract data types. The computer/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, the computer/server 12 in the computer system 10 is shown in the form of a general-purpose computing device. The components of the computer/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer/server 12 typically includes a variety of computer system readable media. Such media may be any available media that is accessible by the computer/server 12, and it includes both volatile and non-volatile media, removable and non-removable media.

The system memory 28 can include computer system readable media in the form of volatile memory, such as random access memory (RAM) 30 and/or cache memory 32. The computer/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

The program/utility 40, having a set (at least one) of program modules 42, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer/server 12 may also communicate with one or more external devices 14 such as a keyboard, a pointing device, a display 24, etc.; one or more devices that enable a user to interact with the computer/server 12; and/or any devices (e.g., network card, modem, etc.) that enable the computer/server 12 to communicate with one or more other computing devices. Such communication can occur via Input/Output (I/O) interfaces 22. Still yet, computer the system/server 12 can communicate with one or more networks such as a local area network (LAN), a general wide area network (WAN), and/or a public network (e.g., the Internet) via a network adapter 20. As depicted, the network adapter 20 communicates with the other components of the computer/server 12 via the bus 18. It should be understood that although not shown, other hardware and/or software components could be used in conjunction with the computer/server 12. Examples, include, but are not limited to: microcode, device drivers, redundant processing units, external disk drive arrays, RAID systems, tape drives, and data archival storage systems, etc.

Figure 2:
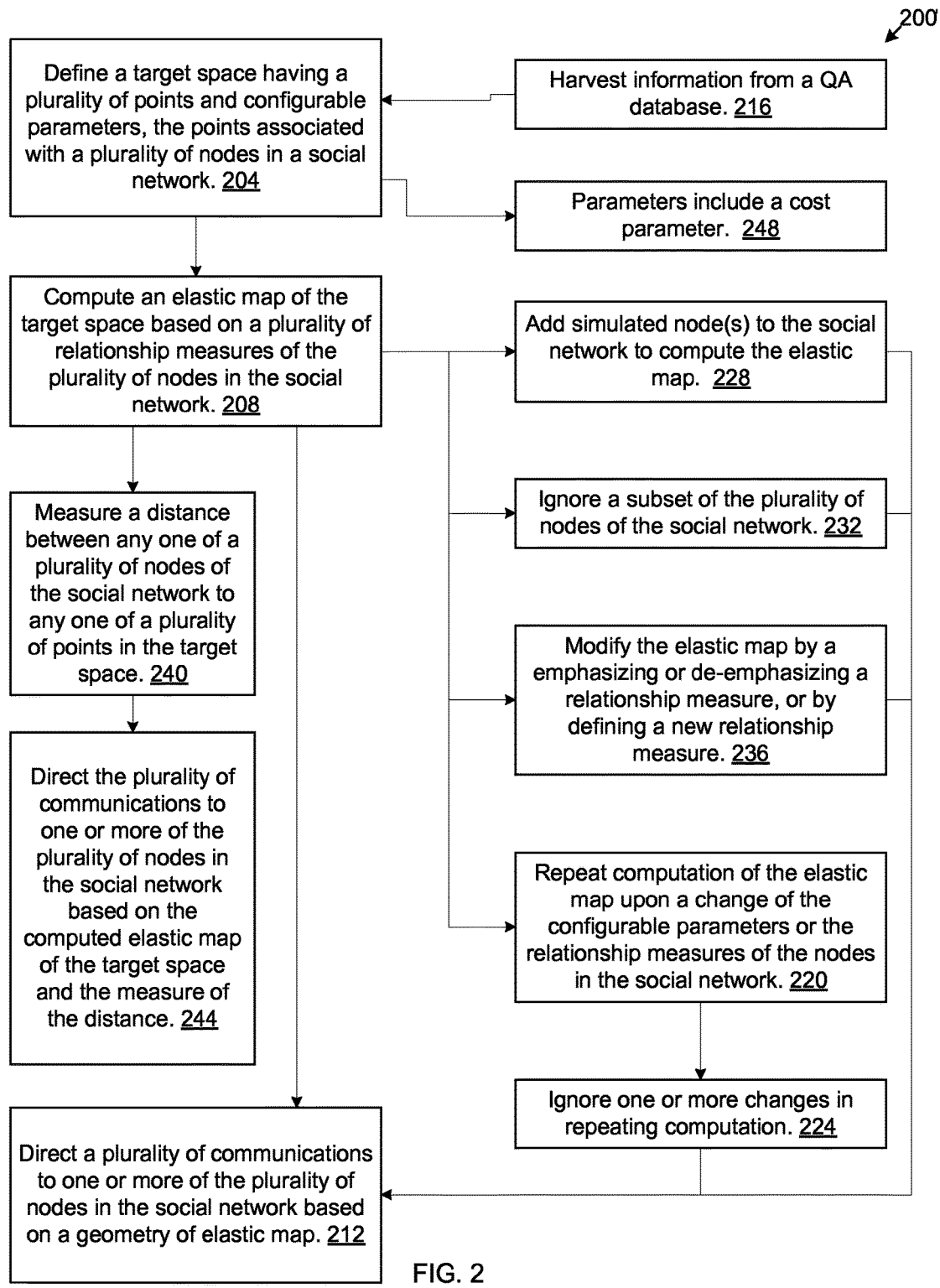
FIG. 2 is a flowchart of a method of directing communications to nodes of a social network, according to an aspect of the present invention.

Referring now to FIG. 2, an aspect of the disclosed invention includes defining 204 a target space having a plurality of points and a set of configurable parameters, computing 208 an elastic map of the target space based on a plurality of relationship measures of a plurality of nodes in a social network, and directing 212 a plurality of communications to the nodes of the social network based on a geometry of the elastic map of the target space. A geometry may refer to any defined measurement of relationships between points in a defined space of n-dimensions, including for example, the elastic map. Details of how each of these is implemented are discussed below, along with other features that may be implemented in related embodiments of the invention.

According to an aspect of the disclosed invention, the method 200 defines 204 a target space having a plurality of points and a set of configurable parameters. The target space may be a set of points having related configurable parameters that define or related to the points. In one embodiment, the points that are defined in the target space may be a set of products offered for sale by a company. These points may be represented by electronic data on a computer. Parameters that shape the target space, in this embodiment, may include features of the products, including, for example, the material used in them, their technical details, and/or the purpose they serve. They may be, for example: electronics, furniture, home improvement, etc. They may additionally include the products' cost range, and any other feature that the company may wish to use to identify its products. Furthermore, each such parameter may be multi-layered; for example, there may be additional parameters within the electronics parameter to distinguish between a mobile phone and a digital monitor. These parameters of the target space may collectively be used by the method 200 to construct a Euclidean space of the points in relation to which space the target space is defined, with the parameters defining coordinates of that space.

The method 200 may compute 208 an elastic map of the target space based on a plurality of relationship measures of a plurality of nodes in a social network. The computation 208 of the elastic map molds the social network into the target space, based not only on each node's connection to one or more points of the target space, but also on the degree of connectivity between each node of the social network and each of the other nodes of the social network. The computation 208 therefore integrates the social network into the target space, using the parameters of the target place as anchors to which some or all nodes of the social network are bounded. Consequently, in directing 212 communications to one or more nodes of the social network (as discussed below), the method 200 allows for quantifiable measures to distinguish one node from another, in a meaningful way, that allows the communications to have more relevance and significance to those who receive them. The accuracy and the usefulness of the mapping depend on the definition of the points of the target space, their parameters, and the information in the social network. In directing 212 the communications, the method 200 may take advantage of different aspects of a geometry of the elastic map of the target space, as described below.

A social network may refer to a collection of nodes, a node being an identifiable entity or a set of information identified (or identifiable) as a unit that is capable of receiving a communication (including, for example and without limitation, postal mail, electronic mail, telephonic/text/instant messaging, and facsimile). A node may be associated with a natural human being or an abstract entity (such as a corporation) having a defined or determinable identity and capable of receiving a communication. Examples of nodes of may include, without limitation, individuals having an account or profile on an online social network, a company's employees in a network of such employees, or a set of companies connected on a social network. The social network may be hosted on one or more computers/systems.

A non-limiting feature of the social network and its nodes, according to the present disclosure, is that the social network is capable of identifying, recording, maintaining, or tracking one or more characteristics of the nodes in the network, and construe, construct, or track relationship measures of a node relative to one or more other nodes, based on those characteristics. For example, the social network may maintain genealogy information of individuals in the social network. Based on this information, the social network may maintain a relationship measure corresponding to family ties between the individuals in the network. It is not necessarily the case, however, that any of the individuals/nodes are in fact connected by any such relationship measure. For example, none of the individuals in the social network may in fact be family members. In some cases, the absence of a relationship measure that the social network can track may, in and of itself, provide important insight into the nature of that social network.

Identifying and maintaining relationship measures in the social network do not require that nodes of the social network possessing the corresponding relationships be aware of the relationships. For example, two individuals in a social network may have a strong relationship measure based on a mutual affinity for the same sports team or the same genre of movies, without either individual knowing of the other's interests.

A social network used by the method 200 may be an existing network. In some embodiments, however, the network may be constructed from existing information that may be scattered. For example, the method 200 (or another method whose output is accessible by the method 200) may access data sources and analyze the corresponding data to generate individual nodes having identities and relationship measures. As a more specific example, the method 200 may analyze data from databases of communications between individuals and determine, based on the content of such communications, the names of the individuals involved, their familial or social relationships, and other information that may define the individuals and their relationships to one another. This analysis may even be performed across multiple existing or constructed social networks to arrive at a more detailed social network. This may be accomplished, for example, by analyzing data of multiple existing social networks, identifying nodes in each of them, and determining whether a node in one such network may have an alias in one or more of the other networks, and combine their respective information into a new node. In this manner, the method 200 may extract latent information in the various existing social networks to generate a more comprehensive social network having more nodes and/or more dimensions.

The computed 208 map is referred to as elastic because one or more of the relationship measures that the map is based on have the capacity for change. For example, one relationship measure in a social network may be a family relationship among individuals (each of which may be a node in the social network), where an individual A is the spouse of an individual B, their marital status being a relationship measure of the social network and informing the computation of the elastic map. In the event of a separation between individual A and individual B, the relationship measure is changed. The method 200 may continually evaluate such relationship measures as described below and update the elastic map to reflect the changes.

In computing 208 the elastic map and evaluating relationship measures of the nodes of the social network, the method 200 may determine a proximity value for each node with respect to one or more additional nodes. Furthermore, the relationship measures of the nodes may be weighted differently and assigned a strength value, such as to distinguish, for example, between a friendship versus an acquaintance among individuals, or between a corporate ownership versus a joint venture relationship among corporations. Additionally, sharing some characteristics may increase the strength of connectivity between two nodes, whereas other shared characteristics may lessen it (for example, where the shared characteristic is an indication of competition and tension).

Additionally, the method 200 may determine a cost of communication value for each node of the social network that is mapped to the target space in the computation 208 of the elastic map. Such cost information may provide valuable information, as will be described, regarding which nodes mapped to the target space in the elastic map should have communications directed 212 to them.

The specific mechanism through which the elastic map may be computed 208 may vary from one embodiment of the disclosed invention to another. Furthermore, an elastic map that is computed in one way may be modified by another method of computation before the elastic map is used to inform decisions on who should receive the directed 212 communications. According to one such embodiment, a target space may include a set of advertisements (the advertisements being points of the target space), which may be represented by a set of vectors S in a multi-dimensional Euclidean space, where each advertisement's vector represents the different dimensions of the content of the advertisement, typically based on an analysis of the good or service to be advertised.

These dimensions may be determined a priori, such as "electronics," "household goods," and "exercise related" or may be discovered by an unsupervised analysis (e.g., Principal Components Analysis) of raw measurements of the advertising content. Thus each dimension of the space represents qualities of the content of all advertising, and ads of a particular type are given a large magnitude in the dimension of this quality in their vector representations.

In this embodiment, the members of a social network may be represented by a set of host nodes Wj in the same space as S, such that each advertisement s in S is mapped to the closest individual node Wj represented by a set of classes K. An energy of the system, D, is then the energy of springs with unit elasticity that connect each advertisement to its targeted/related individual. On the set of individuals, an additional structure may be defined which describes the topology of the social network, including friend relationships between pairs of nodes (Wi, Wj), and other topological constraints imposed by communication cliques (e.g., Twitter®), and other higher order relationships, represented as tuples of nodes, which approximate bending ribs (Wi, Wj, Wk) of the elastic map. A stretching energy of the map U_E is then a function of how far apart pairs of individual nodes that have social relatedness are mapped in the space, and the bending energy, U_G, is a function of how well the mapping of W to the space abides by the topological constraints of the communication cliques (bending ribs) of the social network. The total energy of the system may be defined, then, as U=D+U_E+U_G.

The task of targeting advertisements to specific individual nodes in the social network (i.e., calculating an elastic map of the advertisement target space based on relationship measures of the social network) then becomes one of, for a given W, to find K; for a given K, to minimize U and find the new W; if there is no change, to terminate. This approach terminates when the individuals of a social network are appropriately allocated to the different points/dimensions of the Euclidean target space, and the minimization of U ensures that the mapping of advertisements to these individuals, K, is efficient and thus cost-effective. Furthermore, the topology of the social network can be an important constraint in this optimization, forcing product and service categories and their advertisements to be targeted to individuals that are tightly coupled via the social network.

With continued reference to FIG. 2, the method 200 may direct 212 a plurality of communications to one or more of the plurality of nodes in the social network that exist in the computed 208 elastic map of the target space. The communication(s) may be, for example, an advertisement that is tailored to the target space. Since the social network has been mapped into the target space by computing 208 the elastic map, the method 200 can direct 212 its communications to only a subset of the nodes of the social network who fall into defined and configurable parameters or constraints. This can eliminate the need to attempt to reach all members of the social network, or to select such a subset blindly without taking advantage of the latent information available from the social network and from the target space. This can reduce significantly the cost associated with directing such communications, by eliminating those nodes the method 200 determines not to be relevant to the defined 204 target space. For example, where an advertising firm charges a client a fee for every 1,000 emails sent out on the client's behalf, it becomes important to select the right recipients with as much accuracy as is possible. The advertiser may prefer to reach the 1,000 nodes of the social network closest to a particular product that it wishes to advertise.

With continued reference to FIG. 2, the method 200 may also compute 208 the elastic map of the target space in the social network by adding 228 one or more simulated nodes of the social network in its analysis. The simulation, or the addition of the simulated nodes to the social network, may be done by the method 200 itself, although this is not necessary. For example, the social network data available to the method 200 may already include the simulated node(s). Alternatively (or in addition), existing nodes of the social network may be modified through a simulation.

One purpose for simulating a whole node or parts thereof may be to test the effect of such change in the social network on the computation 208 of the elastic map (which has been described in detail above), as well as the cost associated with directing 212 communications to the nodes in the elastic map. For example, a particular node's relationship measures to other nodes may be creating excessive tensions in the elastic map, suggesting that a large number of nodes may be unsuitable to have communications directed 212 to them, where other information not considered in the computation 208 of the elastic map suggests this information is inaccurate or inapplicable.

According to a more specific example, addition 228 of simulated nodes may allow an advertiser to engineer and influence a social network through marketing or other means, before directing 212 other communications to the nodes of the social network. The simulated node inserted into the social network may change (including strengthening or weakening) relationship measures of existing non-simulated nodes. For example, a simulated node may be configured based on an assumed set of common interests between a set of nodes in the social network who are not aware of one another's existence (for example, people who love the same book) and who have not otherwise indicated that they should be connected. Each node in this set may, through its engineered association with the simulated node, become aware and begin interacting with the other nodes in the set, including, for example, by sending messages. If a number of times two nodes message one another is a relationship measure, or affects a relationship measure, in the social network, the simulated node will have increased the strength of this relationship measure among the nodes of the set. Increased relationship measures, in turn, will affect the elastic map of the target space. Whereas these nodes may not have been closely mapped before, they may be closely mapped after using the simulated node. Simulated nodes may also be used to discourage relationships deemed unhelpful to the elastic mapping; the simulated node may take advantage of differences between otherwise connected nodes to pull them in different directions and reduce the strength of their relationship measures.

By way of an additional specific example, individuals in a social network may identify themselves as being fans of two competing sports teams. An advertisement featuring a prominent player of the first of the two teams may be deemed unsuitable or ineffective if directed at fans of the second team. Computation 208 of an elastic map of a target space having parameters that relate to the prominent player may, therefore, result in tensions in the elastic map, such tensions resulting in corresponding individuals being deemed unsuitable to receive the advertisement. However, there may be circumstances where the rivalry of the two teams in fact is not relevant to the effectiveness of advertisement under consideration. This may be the case, for example, where the player to be featured in the advertisement is respected by a significant percentage of fans of any team in the sport. Adding simulated nodes to the social network may allow for introducing this factor into the calculations, or at least to determine whether such a factor, if indeed true, would at all make a difference in the nature of the elastic map. Based on the result of adding 228 a simulated node(s) or simulated characteristics to an existing node(s), the method 200 can guide further market research. If no significant change in the elastic map is detected after the simulation, it may be reasonable to conclude that verifying the premise of the simulation through market research would not be worth the cost.

Having added 228 simulated nodes to the social network, the method 200 may repeat 220 computation of the elastic map (as described below) before directing 212 communications to the nodes of the social network.

With continued reference to FIG. 2, the method 200 may ignore 232 a subset of the nodes of the social network, or characteristics thereof, in computing 208 the elastic map, which otherwise may seem suitable for directing 212 communication to based on the computed elastic map. One purpose for ignoring a node may be that the node has or appears to have a distorting effect on the elastic map in an inaccurate or undesirable way. By way of a more specific example, parents and their children in a social network may have strong relationship measures that result, under ordinary conditions, in an elastic map that maps them closely to a shared set of points in the target space. This may not be a desirable mapping where, for example, the points in the target space comprise clothing available only in adult sizes, but not for children. Ignoring a parental relationship measure of the social network may, therefore, eliminate a potentially distorting factor in calculating the elastic map.

Having ignored 232 a subset of the nodes, the method 200 may repeat 220 computation of the elastic map (as described below) before directing 212 communications to the nodes of the social network.

With continued reference to FIG. 2, the method 200 may modify 236 the elastic map by emphasizing or de-emphasizing a measure defined for the plurality of nodes in the social network.

According to a more specific example, the modification 236 may be done by an advertising firm to calculate an optimal elastic map of a social network by emphasizing familial relationships of the nodes in the social network during a family holiday season, on an assumption that nodes of the social network may be looking to purchase products for their family members.

Additionally, the method 200 may assign a new relationship measure to a set of nodes, and evaluate the way in which such measures change the elastic map. The inclusion of the previously undefined measure may be characterized as the following question: if accurate, would the nature of the social network (including the previously undefined measure) have a meaningful impact on the nature of the elastic map? If so, it may be prudent to in fact add the previously undefined measure to the characteristics of the nodes in the social network, and to expend resources to determine how individuals in the social network relate to the added characteristic. Data for the new relationship measure may be collected from a database, or generated dynamically by analyzing communications between the nodes, or by analyzing latent information available (for example, information about nodes available across multiple social networks or other data sources).

Having modified 236 the elastic map as described above, by a measure not defined for the nodes, the method 200 may repeat 220 computation of the elastic map (as described below) before directing 212 communications to the nodes of the social network.

With continued reference to FIG. 2, the method 200 may repeat 220 computation of the elastic map upon a change of the configurable parameters of the target space, the relationship measures of the nodes of the social network, or both, to obtain an updated elastic map. The method 200 may subsequently direct 212 communications to nodes of the social network as described in detail, above.

With continued reference to FIG. 2, in repeating 220 computation of the elastic map, the method 200 need not take into account every change that has occurred. It may instead ignore 224 those changes that don't meet a certain criteria, including for the reasons described above. The method 200 may subsequently direct 212 communications to nodes of the social network, as described above.

With continued reference to FIG. 2, in computing 208 the elastic map, the method 200 may also measure 240 a distance between any one of a plurality of the nodes of the social network to any one of a plurality of points in the target space. Based on the distance, the method 200 may rank 236 nodes of the social network. For example, With continued reference to FIG. 2, the method 200 may direct 244 the plurality of communications to one or more of the nodes in the social network (and in the target space) based on the computed 208 elastic map of the target space, and the measured 236 distance between the nodes of the social network and points of the target space.

With continued reference to FIG. 2, parameters of the defined 204 target space may include 244 a cost parameter that determines a cost associated with directing 212 a communication to one or more nodes of the social network.

In calculating the energies of the elastic map, this cost may be included as one of the factors to be considered in the computation 208.

Although the description of the method 200 has primarily referred to the relevant target space being products (or services) for sale, the corresponding communications being advertisements, and the corresponding social network being potential consumers of such products and potential recipients of such communications, other embodiment of the disclosed invention are possible. One such embodiment may include, without limitation: a social network whose nodes are users of a QA (question-answering) system; communications that include a set of QA queries and associated responses; and a target space that defines characteristics of the social network that may provide a useful mapping of its nodes to the QA queries and associated responses. A QA (question-answering) system may be defined as computer systems that answer natural language questions by querying data repositories and applying elements of language processing, information retrieval, and machine learning to arrive at a conclusion. The term QA is a generic term and includes, without limitation, IBM's® DeepQA technology, as described in US patent publication US20090287678 A1, titled "System and Method for Providing Answers To Questions", by Brown et al., filed on May 14, 2008, which is incorporated herein by reference in its entirety.

The above may be implemented by analyzing a social network including, for example, communications between its nodes, to generate a matrix indicating a relationship exists between the nodes, and identifying each type of relationship between the nodes and how they may be related to the QA system (including subordination measures, degree of formality, etc.), the strength of the relationship, as well as overarching contextual information, such as stored conversations, temporal analysis of conversations (e.g. how the level of formality changed over time), information on social aspects of individuals in the relationship, and other factors. Analysis may be based, for example, on the length of responses, relative time taken to respond to messages, the content of the messages, and similar factors. Content may be analyzed for language, tone, relevance to prior messages, etc. A QA system may potentially have access to as much information about individuals who pose it questions as it does to the subject material from which it constructs answers.

Analysis of an individual and the individuals' communication with others can be used to determine the individual's sociotype. This information can be used to enhance analysis of the relationships, and may be used to predict the potential strength of a new relationship, or the fit of an individual to a current group.

Social networks between individuals may be inferred using the matrices derived, as described above. This inferred information may then be used by embodiments of the invention, such as the method 200 (or the method 300 depicted in FIG. 3), to provide information offered by a QA system to individuals/nodes that have not actively solicited them. This may be a useful tool that proactively provides individuals with valuable information that the individuals do not necessarily realize they need, or don't know how to obtain quickly.

Consequently, elements of the method 200 may be equally applicable to a QA system, such as the DeepQA system, the system's query/response information being the communications to be directed to nodes of a social network, the social network being users of the QA system. The target space, in the context of QA systems, may include, for example, keywords associated with queries/responses, or other characteristics of the nodes of the social network which may be deemed useful to serve as a basis for defining a corresponding target space.

Figure 3:
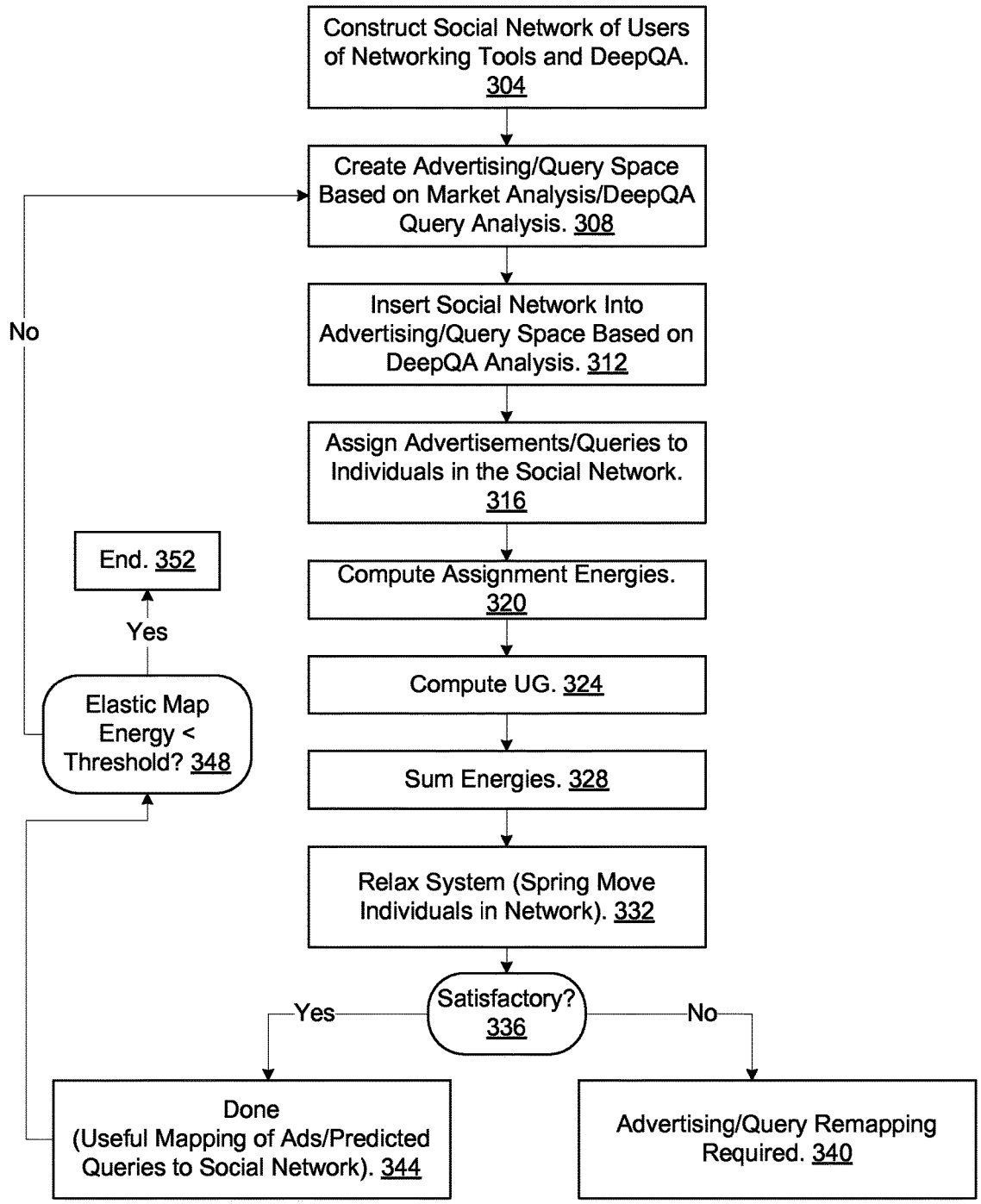
FIG. 3 is a flowchart of a method of directing communications to nodes of a social network, according to an aspect of the present invention.

Referring now to FIG. 3, according to a further embodiment of the present disclosure, a method 300 may construct 304 a social network of users of a networking tool (or a set thereof) and DeepQA (alternatively, the social network may be already constructed and simply referred to by the method 300). Although the embodiment depicted in FIG. 3 is described in connection with a DeepQA system, such description applies equally to QA systems in general, and therefore should not be read as limited to only DeepQA technology. DeepQA refers to a set of information that includes queries submitted by users of a DeepQA system, as well as responses thereto, which may have been compiled by an automated natural language query system. In this embodiment, queries and associated responses form the points of the target space, and the social network includes nodes (which may be individuals) that are users of the corresponding networking tool (which provides query capabilities, etc.).

With continued reference to FIG. 3, the method 300 may create 308 an advertising/query space based on a market analysis/DeepQA query analysis. This may include information that is generated automatically by analyzing existing collections of data (for example, data about a market, or query data), or data that is gathered and fed into the method 300.

With continued reference to FIG. 3, the method 300 may insert 312 the social network into the advertising/query space based on the market/DeepQA analysis, as described in connection with the method 200 and the examples recited in connection therewith. Advertisements or queries may be assigned 316 to individuals in the social network according to the how the social network is inserted 312 into the corresponding target space.

Based on the assignments 316 of advertisements/queries to individuals in the social network, the method 300 may compute 320 corresponding assignment energies; compute 324 corresponding UG values; sum 328 the energies; and relax 332 the system (i.e. spring move individuals in the network), as described in connection with the method 200.

The method 300 may evaluate the results of these computations to determine whether the results are satisfactory in relation to the defined parameters of the target space (for example, whether associated costs are acceptable). If not, a remapping 340 is required and may be performed until a satisfactory mapping is made.

If the results of the computations are satisfactory, the method 300 can be said to be done 344, having arrived at a useful mapping of ads and predicted quests to the social network. If thereafter the elastic map energy is less than a predefined threshold (which may be configurable), the method may end 352. Otherwise, the method may again create 308 an advertising/query space based on new or modified market analysis/DeepQA Query analysis.

Other embodiments of the invention may be used to provide traffic alerts, enterprise communications, announcements, health alerts, general warnings, how-to information, tips on software usage, and other forms of communication to members of social networks that fit into a corresponding target space.

Figure 4:
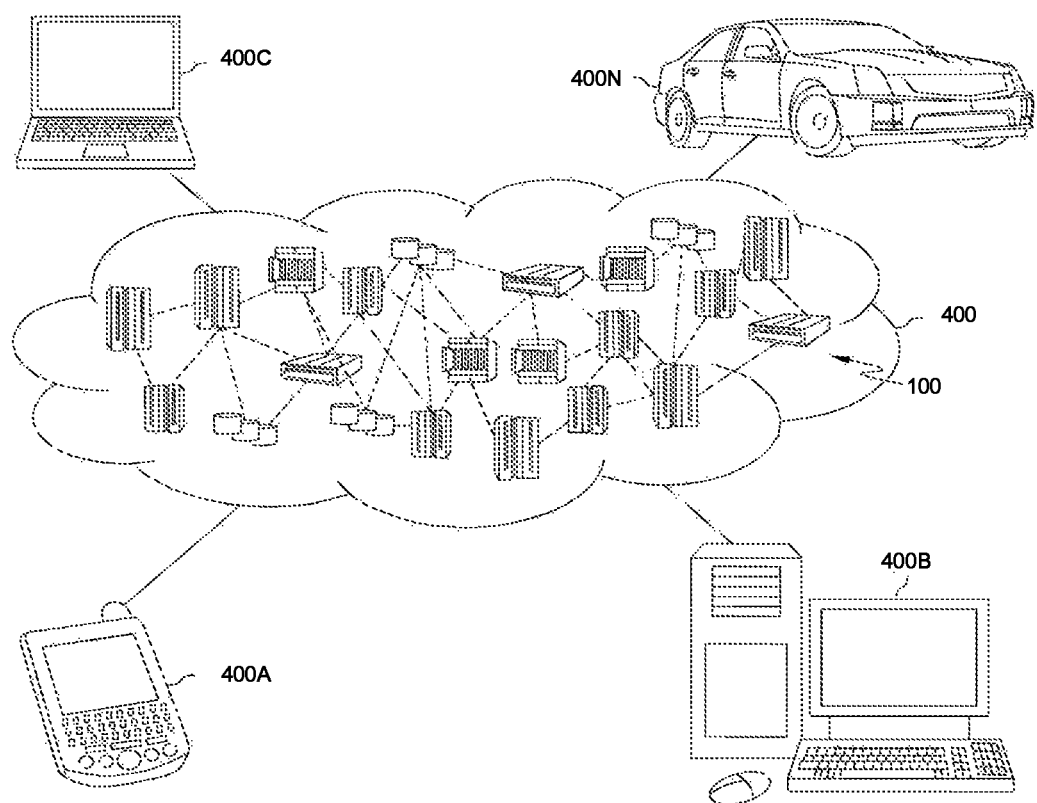
FIG. 4 is a schematic block diagram of an illustrative cloud computing environment, according to an aspect of the disclosed invention.

Referring now to FIG. 4, an illustrative cloud computing environment 400 is depicted. As shown, the cloud computing environment 400 comprises one or more cloud computing nodes, each of which may be a system 100 (FIG. 1) with which local computing devices used by cloud consumers, such as, for example, a personal digital assistant (PDA) or a cellular telephone 400A, a desktop computer 400B, a laptop computer 400C, and/or an automobile computer system 400N, may communicate. The nodes 100 may communicate with one another. They may be grouped (not shown) physically or virtually, in one or more networks, such as Private, Community, Public, or Hybrid clouds as described hereinabove, or a combination thereof. This allows the cloud computing environment 400 to offer infrastructure, platforms and/or software as services for which a cloud consumer does not need to maintain resources on a local computing device. It is understood that the types of computing devices 400A-N shown in FIG. 4 are intended to be illustrative only and that the computing nodes 100 and the cloud computing environment 400 can communicate with any type of computerized device over any type of network and/or network addressable connection (e.g., using a web browser).

Figure 5:
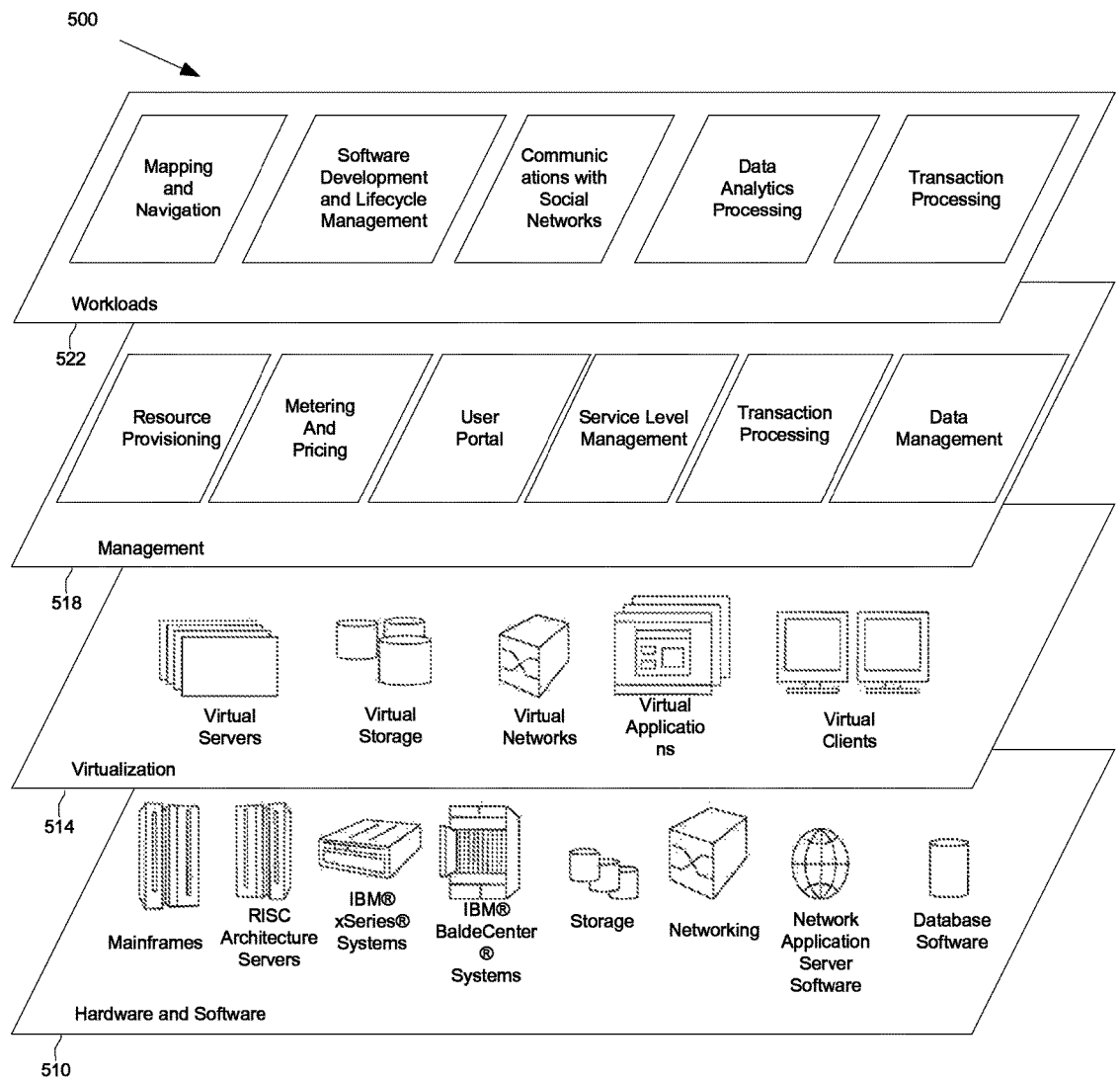
FIG. 5 is a multi-layered functional illustration of the cloud computing environment depicted in FIG. 4 according to an exemplary embodiment of the disclosed invention.

Referring now to FIG. 5, a set of functional abstraction layers provided by the cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

The hardware and software layer 510 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 514 provides an abstraction layer from which the following examples of virtual entities may be provided: virtual servers; virtual storage; virtual networks, including virtual private networks; virtual applications and operating systems; and virtual clients.

In one example, the management layer 518 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 522 provides examples of functionality for which the cloud computing environment may be utilized. Examples of workloads and functions which may be provided from this layer include: mapping and navigation; software development and lifecycle management; virtual classroom education delivery; data analytics processing; transaction processing; and analysis of and communications with social networks and computation of elastic maps of a target space, including, for example, those discussed in connection with FIGS. 2-3.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

We claim:

1. A computer-implemented method for directing communications to a set of nodes in a social network on a plurality of computerized hosts, the method comprising:
    defining a target space of data on a computer, the target space having a plurality of points and a set of configurable parameters, using a computer, wherein the plurality of points in the target space comprise electronic data associated with a product;
    computing an elastic map of the target space based on a plurality of relationship measures of a plurality of nodes in a social network, using a computer,
        wherein the plurality of nodes comprise profiles of a social network capable of receiving a communication;
        wherein computing the elastic map comprises associating at least one node of the plurality of nodes in the social network with at least one point of the plurality of points in the target space, and
        wherein the plurality of relationship measures comprise a proximity value for the at least one node of the plurality of nodes and at least another node of the plurality of nodes; and
    directing a plurality of communications to a set of nodes of the plurality of nodes in the social network based on a geometry of the computed elastic map of the target space, wherein the plurality of communications to the set of nodes include a query.

2. The method of claim 1, wherein defining a target space includes harvesting information from a DeepQA database communicating with a computer.

3. The method of claim 1, wherein computing the elastic map is repeated upon a change of one or more of the configurable parameters of the target space or upon a change in one or more of the plurality of relationship measures of the plurality of nodes in the social network.

4. The method of claim 3, wherein a change of one or more of the configurable parameters of the target space is ignored.

5. The method of claim 1, wherein the computed elastic map is modified by emphasizing/de-emphasizing a relationship measure of the nodes of the social network, or by a relationship measure not defined for the plurality of nodes in the social network.

6. The method of claim 1, wherein computing the elastic map ignores a subset of the plurality of nodes.

7. The method of claim 1, wherein simulated nodes are added to the social network to compute the elastic map.

8. The method of claim 1, further comprising:
    measuring a distance between any one of the plurality of nodes and any one of the plurality of points in the target space, by a computer; and
    directing the plurality of communications to each node in the plurality of nodes in the social network based on the measured distance between the node and the plurality of points in the target space, by a computer.

9. The method of claim 1, wherein the plurality of configurable parameters includes a cost parameter.

10. A system for directing communications to a set of nodes in a social network on a plurality of computerized hosts, the system comprising:
    a computer having a processor and a computer-readable storage device; and
    program instructions stored on the computer-readable storage device for execution by at least one of the one or more processors, the program instructions comprising:
        instructions to define a target space having a plurality of points and a set of configurable parameters, wherein the plurality of points in the target space comprise electronic data associated with a product;
        instructions to compute an elastic map of the target space based on a plurality of relationship measures of the a plurality of nodes in the social network, using a computer,
            wherein the plurality of nodes comprise profiles of a social network capable of receiving a communication;
            wherein computing the elastic map comprises associating at least one node of the plurality of nodes in the social network with at least one point of the plurality of points in the target space, and
            wherein the plurality of relationship measures comprise a proximity value for the at least one node of the plurality of nodes and at least another node of the plurality of nodes; and
        instructions to direct a plurality of communications to a set of nodes of the plurality of nodes in the social network based on a geometry of the computed elastic map of the target space, wherein the plurality of communications to the set of nodes include a query.

11. The system of claim 10, wherein the instructions to define comprise instructions to harvest information from a QA database.

12. The system of claim 10, wherein the instructions to compute comprise instructions to repeat computing the elastic map upon a change of one or more of the configurable parameters of the target space or upon a change in one or more of the plurality of relationship measures of the plurality of instructions in the social network.

13. The system of claim 10, further comprising instructions to measure a distance between any one of the plurality of nodes in the social network and the plurality of points in the target space, wherein the instructions to direct comprises instructions to direct the plurality of communications to each node in the set of nodes in the social network based on the distance between the node and the plurality of points in the target space.

14. The system of claim 10, wherein simulated nodes are added to the social network to compute the elastic map.

15. A computer program product for directing communications in a social network on a plurality of computerized hosts, the computer program product comprising a non-transitory computer-readable storage medium having program code embodied therewith, the program code readable/executable by a processor of a computer to perform a method, the method comprising:
    defining, by the processor, a target space having a plurality of points and a set of configurable parameters, wherein the plurality of points in the target space comprise electronic data associated with a product;
    computing, by the processor, an elastic map of the target space based on a plurality of relationship measures of a plurality of nodes in a social network, wherein the plurality of nodes comprise profiles of a social network capable of receiving a communication;

wherein computing the elastic map comprises associating at least one node of the plurality of nodes in the social network with at least one point of the plurality of points in the target space, and wherein the plurality of relationship measures comprise a proximity value for the at least one node of the plurality of nodes and at least another node of the plurality of nodes; and directing a plurality of communications to a set of nodes of the plurality of nodes in the social network based on a geometry of the computed elastic map of the target space, wherein the plurality of communications to the set of nodes include a query.

16. The computer program product of claim 15, wherein defining a target space includes harvesting, by the processor, information from a QA database.

17. The computer program product of claim 15, wherein computing the elastic map is repeated, by the processor, upon a change of one or more of the configurable parameters of the target space or upon a change in one or more of the plurality of relationship measures of the plurality of nodes in the social network.

18. The computer program product of claim 15, wherein the method further comprises measuring, by the processor, a distance between any one of the plurality of nodes in the social network and the plurality of points in the target space, wherein the directing, by the processor, directs the plurality of communications to each node in the set of nodes in the social network based on the distance between the node and the plurality of points in the target space.

19. The computer program product of claim 15, wherein the plurality of configurable parameters includes a cost parameter.

* * * * *